Nov. 3, 1964   C. H. SAYRE ETAL   3,154,844
PROCESS FOR MAKING COMPOSITE BEARINGS
Filed Dec. 9, 1960
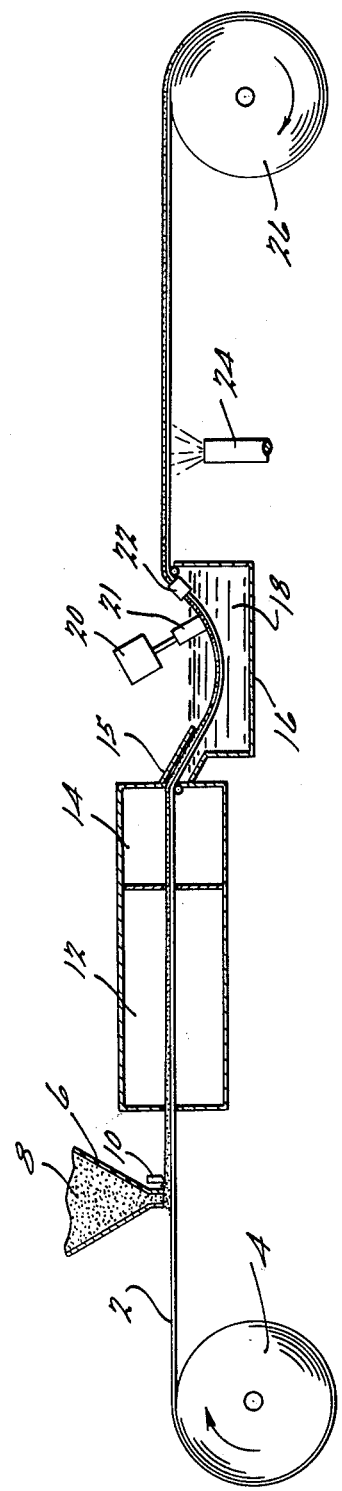
INVENTORS.
Charles H. Sayre
Edward J. Lewis
James W. O'Brien
BY
Barnes, Dickey & Pierce
ATTORNEYS 3,154,844
PROCESS FOR MAKING COMPOSITE BEARINGS
Charles H. Sayre, Ypsilanti, and Edward J. Lewis and James W. O'Brien, Greenville, Mich., assignors to Federal-Mogul-Bower Bearings, Inc., Detroit, Mich., a corporation of Michigan
Filed Dec. 9, 1960, Ser. No. 74,801
6 Claims. (Cl. 29—420)

The present invention broadly relates to bearings and more particularly, to an improved process for making a composite bearing material suitable for use in the manufacture of sleeve bearings and the like.

Composite bearing materials of the general type to which the present invention relates are comprised of a hard metal backing member to one surface of which a thin bearing lining is applied and tenaciously bonded thereto. The use of a hard metal backing member such as steel, for example, is necessary inasmuch as the metal or metal alloys in the bearing lining are usually too soft to withstand deformation under the loads imposed thereon during use. The bearing lining can be applied to the backing member by bonding a thin sheet of bearing material to one surface of the backing member or alternatively, by employing powder metallurgical techniques wherein a powder blend of bearing materials is sintered and tenaciously bonded to the backing member. It is common practice in the manufacture of precision bearings to further improve the bearing characteristics of the bearing lining by applying a so-called "over-plate" forming thereby a tri-layer composite bearing material. Although improved bearing characteristics are achieved by the over-plate on the bearing lining surface, the application of the over-plate constitutes a time consuming and costly operation and the resultant bearing surface cannot be thereafter appreciably machined to receive oversized shafts as encountered in maintenance.

Accordingly, it is a primary object of the present invention to provide an improved composite bearing material applicable for use in the manufacture of sleeve-type bearings for internal combustion engines and the like and which bearing material possesses bearing properties approaching those which heretofore could only be achieved through the use of an over-plate on the bearing lining, and enables machining of the lining to accommodate oversize shafts.

Another object of the present invention is to provide an improved process for manufacturing composite bearing materials having excellent bearing characteristics approaching those obtained in tri-layer bearings and which bearing material is of high strength, of good fatigue and corrosion resistance, and which does not excessively wear unhardened steel shafts rotatably journaled therein.

Still another object of the present invention is to provide an improved process for making composite bearing materials which enables the direct superposing and sintering of a blend of copper and lead powders in controlled proportions on the surface of a hard metal backing strip producing a tenacious bond therebetween without requiring the surface of the strip to be preliminarily copper plated to achieve satisfactory bonding.

A further object of the present invention is to provide an improved process for manufacturing bearing materials comprising a sintered porous matrix predominantly of copper tenaciously bonded to a hard backing member and which porous matrix is infiltrated with a relatively high percentage of a lead-tin bearing alloy under controlled conditions whereby an undesirable degree of diffusion of the tin into the copper matrix is prevented.

A still further object of the present invention is to provide an improved process for making bearing materials which is characterized by the high production capacity, the ease of control and regulation, and the economical operation provided thereby.

Other objects and advantages of the present invention will become apparent from the following detailed description taken in conjunction with the accompanying drawing wherein a schematic view of the improved process for making composite bearing materials is shown which incorporates therein the preferred embodiments of this invention.

The composite bearing material made in accordance with the improved process comprising the present invention and as schematically shown in the drawing is comprised of a sintered porous matrix tenaciously bonded to a hard metal backing member and having the pores of the matrix substantially completely infiltrated and filled with a suitable bearing metal comprising a lead-tin alloy. In order to achieve the benefits of the invention, the composition of the porous matrix and the bearing alloy infiltrated in the pores thereof as well as the conditions for sintering and infiltrating are carefully controlled within prescribed limits as will be subsequently described in detail.

In the preferred practice of the present invention and as diagrammatically shown in the drawings, a suitable hard metal backing strip 2 is continuously unwound from a feed spool 4 and substantially horizontally extended therefrom beneath a hopper 6 containing a powder blend 8 of a predetermined composition. As the backing strip 2 passes beneath the hopper 6, a layer of the powder blend 8 is applied to the upper surface thereof through a suitable metering aperture in the base of the hopper. The backing strip 2 with the powder blend 8 thereon thereafter passes beneath a gate or spreader 10 which smoothens and distributes the powder blend into a layer of substantially uniform thickness.

The backing strip 2 with the substantially uniform layer of the powder blend 8 thereon then passes into a sintering chamber 12 which is maintained at an elevated temperature and is provided with a reducing atmosphere. The conditions in the sintering chamber 12 are maintained within controlled conditions in order to obtain a porous matrix having the desired porosity and which is tenaciously bonded to the backing strip. On leaving the sintering chamber 12 the backing strip 2 with the sintered layer of the powder blend 8 thereon is cooled in a cooling chamber 14 to a prescribed intermediate temperature and passes directly therefrom through a chute 15 into an infiltrating tank 16 containing a molten bearing alloy 18 of a controlled composition and temperature. Infiltration and substantially complete filling of the pores in the sintered porous matrix is facilitated by providing a suitable vibratory mechanism 20 including a stem 21 which is adapted to vibrate the composite strip and the molten bearing alloy relative to each other. Immediately on leaving the infiltrating tank 16 the composite infiltrated strip passes through a suitable asbestos wiper 22 wherein the excess molten bearing alloy is removed from the surfaces of the infiltrated composite strip. After passing through the asbestos wiper 22 the composite strip is rapidly cooled such as by quenching from the underside by a water spray directed through a nozzle 24 and is then air dried and coiled on a takeup spool 26. The resultant composite bearing material can then be employed in the manufacture of sleeve-type bearings and the like by processing the composite strip through conventional forming operations such as, for example, blanking, punching, and stamping.

It will be understood that the compositions of the powder blend and of the molten bearing alloy used to infiltrate the porous matrix as described in this specification and in the subjoined claims are expressed, unless otherwise noted, in terms of percentages by weight.

The hard metal backing strip 2 can comprise any one of a variety of suitable hard metals and metal alloys which after sintering and tenaciously bonding the porous matrix to one surface thereof imparts the desired strength and toughness to the resultant composite bearing strip. Backing strips made of steel, for example, possess satisfactory strength and toughness to enable the resultant composite strip to be subjected to further mechanical working providing therewith a bearing of the desired size and configuration.

The composition of the powder blend employed for forming the porous sintered matrix tenaciously bonded to the backing strip consists predominantly of a finely particulated copper powder and a minor proportion of lead powder. For the purposes of the present invention the copper content in the powder blend can range from about 96% to about 99%. The lead content can range from about 1% to about 3% and preferably, from about 2% to about 2¼%. In addition to copper and lead, the powder blend can also contain from 0% up to about 1% tin if desired, but the inclusion of tin is not essential to the success of the process comprising the present invention.

The copper powder employed in the powder blend is preferably of an irregular shaped configuration so as to provide the necessary porosity required within the resultant sintered matrix enabling subsequent infiltration thereof with a suitable bearing alloy. While a number of copper powders manufactured by different methods can be satisfactorily employed in the practice of the present invention, irregular shaped copper powder derived from an electrolytic deposition method has been found particularly satisfactory providing a strong porous matrix having the requisite porosity. In addition, the particle size of the copper powder is less than about 100 mesh and preferably up to about 60% thereof passes through a 325 mesh screen. The proportion of fines, i.e. the proportion of the copper powder having a particle size less than 325 mesh provides a satisfactory control in combination with other processing controls for obtaining the desired degree of porosity in the resultant matrix. The apparent density of a typical copper powder is in the order of approximately 2.5 grams per cubic centimeter.

The lead powder in the powder blend can be present in the range of from about 1% to about 3% by weight, and is of a fine particle size of about less than 100 mesh. Lead powders having a spherical shape as produced from conventional atomization processes and having a particle size in the range of about 325 mesh or less are preferred for forming the porous sintered matrix in accordance with the practice of the present invention. While lead contents in the powder blend in the order of about 2% to about 2¼% are preferred, satisfactory porous matrices can also be made with powder blends containing as low as about 1% lead through the use of higher sintering temperatures, an increased sintering time, or both. Lead contents, on the other hand, in excess of about 3% cause some difficulty during the sintering of the powder blend due to the excessive formation of a liquid phase which on subsequent solidification tends to cause consolidation and reduces the porosity of the porous matrix below the optimum range.

It is also contemplated, but not necessary to the successful practice of the present invention that a small quantity of tin can be included in the powder blend in an amount ranging up to about 1%. The tin content can be introduced into the powder blend in the form of a finely particulated powder of a particle size less than about 100 mesh, and preferably in the range of about 325 mesh or less, or alternatively, the tin can be preliminarily pre-alloyed with the lead powder constituent and added to the powder blend in that form.

The appropriate proportions of the powder constituents can be mixed in any one of a number of suitable blending apparatuses such as, for example, a double cone type blender until a substantially uniform powder blend is obtained. The resultant powder blend is then introduced into the hopper 6 as shown in the drawing and deposited in the form of a substantially uniform layer on the surface of the backing strip 2.

The substantially uniform layer of the powder blend is sintered under controlled temperature conditions in the sintering chamber 12 which is provided with a reducing atmosphere such as, for example, a cracked gas atmosphere. The liquid phase type sintering of the non-compacted substantially uniform layer of the powder blend 8 is achieved at a temperature of at least about 1750° F. At this temperature the lead constituent in the powder blend and any tin, if present, melts dissolving a quantity of the copper powder forming a liquid phase which wets the remaining copper particles and the surface of the backing strip on which the powder blend is deposited. For example, in a powder blend containing about 98% copper powder and about 2% lead powder at a sintering temperature of slightly over 1750° F., the lead particles melt and in turn dissolve a portion of the copper forming therewith approximately 5% of the liquid phase. As the sintering temperature is increased the quantity of liquid phase present also increases and becomes progressively richer in copper. For instance, at 1780° F. a liquid phase comprising about 9% of the powder blend is present and is composed of about 70% copper and 30% lead. On subsequent cooling of the sintered matrix the liquid phase solidifies bonding the individual copper particles together into a strong continuous porous matrix. In addition, the liquid phase in contact with the surface of the backing strip on solidification rejects the lead therein in the form of small globules and the remaining copper freezes to form a solid continuous bond between the backing strip and the sintered matrix. In view of this latter mechanism, tenacious bonds between the porous matrix and backing strip can be obtained without preliminarily plating the strip with copper to achieve satisfactory bonding.

For the purposes of the present invention, a minimum sintering temperature of about 1750° F. is necessary to achieve a strong porous matrix tenaciously bonded to the backing strip. At sintering temperatures below about 1750° F. a poorly sintered fragile matrix is produced having little or no copper on the surface of the backing strip resulting in a poor bond between the backing strip and the sintered matrix. Accordingly, to achieve a satisfactory composite bearing material, a sintering temperature of at least about 1750° F. must be employed.

As heretofore mentioned, as the sintering temperature is increased above 1750° F. the quantity of liquid phase produced correspondingly increases. Since the quantity of liquid phase present during the sintering operation affects the consolidation or densification of the matrix which in turn affects the porosity of the resultant sintered matrix, the maximum usable sintering temperature is established by the porosity desired in the resultant porous matrix. By employing sintering temperatures ranging from about 1750° F. up to about 1800° F. a strong tenaciously bonded sintered matrix is obtained having a pore volume ranging from about 35% up to about 49%. Pore volumes within the above indicated range enable subsequent infiltration of the porous matrix with a relatively large quantity of a suitable lead-tin bearing alloy. The average diameter of the pores of a typical bearing lining is in the order of about 0.003 inch as measured on a polished cross section taken through a lead-tin alloy filled lining. While sintering temperatures in excess of about 1800° F. can be employed, the pore volume of the resultant sintered matrix decreases to the extent that the quantity of bearing alloy and the ease of infiltration thereof into the porous matrix is undesirably restricted. Accordingly, the upper practical limit of the sintering temperature to achieve bearing materials having optimum bearing characteristics is about 1800° F.

In addition to the effect of the sintering temperature on porosity, strength, and bonding of the matrix to the backing strip, the sintering time is also of some importance in producing a matrix having the desired properties. If the sintering time is too short, such as less than about 2 minutes for example, an insufficient quantity of liquid phase may be formed coupled with insufficient diffusion preventing adequate wetting of the particles and backing strip and thereby resulting in a fragile matrix which is not tenaciously bonded to the backing strip. On the other hand, if the sintering time is excessively long, such as about an hour for example, a reduction is obtained in the number of fine-sized pores with a corresponding creation of fewer comparatively large size pores. In either case, the strength and bearing characteristics of the resultant impregnated matrix are adversely affected. In view of this, it is preferred when employing a sintering technique as specifically herein shown and described to control the sintering time to a duration ranging from about 5 minutes to about 20 minutes. By employing these conditions, composite bearing materials are produced having a high strength matrix incorporating a plurality of relatively fine sized pores and which matrix is tenaciously bonded to the backing strip.

By employing a powder blend having a composition as herein set forth and sintering the powder blend at a temperature ranging from at least about 1750° F. up to about 1800° F., a strong continuous and tenaciously bonded matrix is produced having a pore volume ranging from about 35% up to about 49%. Subsequent infiltration and substantially complete filling of the pores in the sintered matrix with a bearing alloy consisting predominantly of lead enables the manufacture of composite bearing materials containing from about 40% up to about 55% lead in the bearing lining. Bearings of this composition are particularly satisfactory in automobile internal combustion engines and the like and can be manufactured at a relatively economical cost. By incorporating a small quantity of tin in the lead bearing alloy employed for infiltrating the porous matrix, adequate corrosion resistance is obtained for most engine uses. The resultant bearing possesses excellent performance characteristics approaching those obtained with the more costly so-called tri-layer bearings.

After sintering has been completed and prior to infiltration of the porous matrix, the backing strip having the sintered porous matrix thereon is first cooled in the cooling chamber 14 to as low a temperature as possible and still enable infiltration of the porous matrix, such as below about 850° F. Best results are achieved when the composite strip is cooled to an intermediate temperature ranging from about 725° F. up to about 850° F., and preferably from about 775° F. to about 825° F. Cooling of the composite strip in the cooling chamber 14 is carried out under a similar reducing atmosphere as is employed in the sintering chamber 12.

The composite sheet after attaining the appropriate intermediate temperature leaves the cooling chamber 14 through the chute 15 which projects down beneath the surface of the molten lead-tin bearing alloy 18 preventing the escape of the reducing atmosphere from the cooling chamber. The molten bearing alloy 18 is maintained at a temperature below about 850° F. similar to that of the cooled composite strip, that is, from about 725° F. to about 850° F., and preferably from about 775° F. to about 825° F.

The composite strip is preliminarily cooled in the cooling chamber 14 and the molten lead-tin bearing alloy in the infiltrating tank 16 is maintained at as low a temperature as is possible to prevent the tin in the molten bearing alloy from diffusing to any measurable extent into the copper of the sintered porous matrix forming therewith hard, brittle bronze constituents which tend to cause excessive wear of unhardened steel shafts journaled in the bearing and additionally prevents depletion of tin from the lead-tin bearing alloy infiltrant which would otherwise cause a loss in the corrosion resistance thereof. While the low temperatures employed in the practice of the present invention substantially inhibit diffusion of tin from the molten lead-tin bearing alloy into the copper of the porous matrix, a small degree of diffusion does take place and it is for this reason that at least about 2% tin in the molten lead-tin bearing alloy is desired to assure satisfactory corrosion resistance of the resultant infiltrated lead-tin alloy. On the other hand, tin contents in the molten lead-tin bearing alloy in excess of about 4% have a tendency to promote the formation of brittle copper-tin alloys which not only tend to cause excessive wear of unhardened shafts but also increase the susceptibility of fracture of the bearing lining resulting from deformation of the composite material during subsequent forming operations and use. This latter feature is particularly true in the manufacture of flanged-type sleeve bearings in which the composite strip is subjected to severe deformation during subsequent forming operations. Accordingly, tin contents in the molten lead-tin bearing alloy can usually range from about 2% to about 4%, and preferably from about 3% to about 3½%. Infiltration of the porous matrix with a molten bearing alloy of the above composition range and at the temperatures set forth, produces a bearing lining having satisfactory corrosion resistance, strength and durability.

Because of the low temperature of the lead-tin alloy and the composite strip, rapid infiltration of the pores of the sintered porous matrix is inhibited. Inasmuch as the period of time that the composite strip is immersed in the molten lead-tin alloy also affects the amount of diffusion of the tin into the copper matrix, it is desirable to achieve infiltration in as short a period as is possible followed immediately thereafter by rapid cooling of the infiltrated composite strip. Substantially complete infiltration of the porous matrix in about one minute or less is achieved by incorporating a vibratory mechanism 20 in the infiltrating tank 16 in accordance with the preferred practice of this invention as shown in the drawing, which transmits vibrational energy to the composite strip, performing a cleaning action on the lining surface and the surfaces within the porous sintered matrix whereby oxides and other films are quickly removed facilitating infiltration of the lead-tin bearing alloy and rapid wetting of the surfaces of the composite strip. The vibrational energy transmitted to the composite strip while immersed in the infiltrating tank 16 can be achieved by an ultrasonic generator or by an air vibrator actuated by air pressure. The minimum vibrational frequency necessary to substantially facilitate infiltration is about 3000 cycles per minute while frequencies in the order of about 8000 to about 12,000 cycles per minute or above are preferred.

In a typical air-actuated vibrating mechanism 20, the generator is disposed above the infiltrating tank 16 as shown in the drawing, having the stem 21 thereof projecting into the molten bearing alloy 18 and having the end surface thereof adjacent to the sintered porous matrix. The distance between the end of the stem 21 of the vibrator and the surface of the porous matrix is preferably in the order of about .010 inch. A spacing greater than about .010 inch causes a rapid reduction in the efficiency of transmission of the vibrational energy necessitating higher capacity vibrational mechanisms or a greater quantity thereof. It has been found that about 2 kilowatts of vibrational energy are required to infiltrate a relatively thin porous sintered matrix of the composition and porosity set forth above with a lead-tin bearing alloy under the temperature conditions hereinabove set forth. The stem 21 of the vibratory mechanism 20 extends transversely of the composite strip providing full coverage of the porous sintered matrix and assuring substantially complete infiltration thereof. Satisfactory infiltration of the porous matrix has been achieved by employing a plurality of vibratory mechanisms spaced at intervals in the infiltrating tank 16 providing therewith progressive and finally substantially complete infiltration of the porous matrix.

After substantially complete infiltration of the porous sintered matrix has been achieved, the composite strip emerges from the molten bearing alloy 18 and immediately thereafter passes through an asbestos wiper 22 which removes the excess bearing metal from the upper and lower surfaces of the infiltrated composite strip. The infiltrated composite strip is thereafter rapidly cooled such as by directing a water spray against the lower surface of the strip through the nozzle 24 inhibiting further diffusion of any tin from the lead-tin infiltrated bearing alloy into the copper of the porous matrix. The cooled composite strip is thereafter air-dried and wound up on the takeup spool 26.

The resultant composite bearing material made in accordance with the method hereinbefore described has excellent bearing performance characteristics and can be readily fabricated into a variety of different bearing configurations and sizes.

While it will be apparent that the preferred embodiments herein illustrated are well calculated to fulfil the objects above stated, it will be appreciated that the invention is susceptible to modification, variation and change without departing from the proper scope or fair meaning of the subjoined claims.

What is claimed is:

1. The method of making a composite strip suitable for the manufacture of bearings and the like comprising the steps of providing a hard metal backing strip and a substantially uniformly mixed powder blend consisting essentially of from about 96% to about 99% irregular shaped copper powder having a particle size less than about 100 mesh of which up to about 60% thereof has a particle size less than about 325 mesh, and from about 1% to about 3% lead powder and from about 0% to about 1% tin powder having a particle size less than about 100 mesh; superposing a relatively uniform layer of said powder blend on said backing strip, sintering said layer in a reducing atmosphere at a temperature ranging from about 1750° F. to about 1800° F., and thereafter cooling the sintered said layer in a reducing atmosphere to a temperature ranging from about 725° F. to about 850° F. forming a composite strip including a sintered porous matrix tenaciously bonded to said backing strip, immersing said composite strip in a molten lead-tin bearing alloy at a temperature ranging from about 725° F. to about 850° F., relatively vibrating said composite strip and said molten bearing alloy at a frequency of at least about 3,000 cycles per minute causing infiltration and substantially complete filling of the pores of said porous matrix, said molten bearing alloy consisting essentially of from about 2% to about 4% tin and the balance lead, and thereafter removing the excess of said bearing alloy from said composite strip and rapidly cooling said composite strip.

2. The method as described in claim 1 wherein said sintered porous matrix has a pore volume ranging from about 35% to about 49%.

3. The method as described in claim 1 wherein the resultant bearing lining consisting of the infiltrated said porous matrix contains from about 40% to about 55% lead.

4. The method as described in claim 2 wherein the average pore diameter is in the order of about .003 inch.

5. The method of making a composite bearing strip suitable for the manufacture of bearings and the like comprising the steps of providing a hard metal backing strip and a substantially uniformly mixed powder blend having a particle size less than about 100 mesh and consisting essentially of from about 96% to about 99% copper, from about 1% to about 3% lead, and from about 0% to about 1% tin; superposing a relatively uniform layer of said powder blend on said backing strip, sintering said layer in a reducing atmosphere at a temperature ranging from about 1750° F. to about 1800° F. and thereafter cooling the sintered said layer in a reducing atmosphere to a temperature ranging from about 775° F. to about 825° F. forming a composite strip including a sintered porous matrix tenaciously bonded to said backing strip, immersing said composite strip in a molten lead-tin bearing alloy at a temperature ranging from about 775° F. to about 825° F., relatively vibrating said composite strip and said bearing alloy at a frequency of at least about 3,000 cycles per minute causing infiltration and substantially complete filling of the pores thereof, said bearing alloy consisting essentially of from about 2% to about 4% tin and the balance lead, and thereafter removing the excess of said bearing alloy from said composite strip and cooling said composite strip.

6. The method of making a composite strip suitable for the manufacture of bearings and the like comprising the steps of providing a hard metal backing strip and a substantially uniformly mixed powder blend consisting essentially of from about 97¾% to about 98% irregular shaped copper powder having a particle size less than about 100 mesh of which up to about 60% is less than about 325 mesh, and the balance a lead powder having a particle size less than about 325 mesh; superposing a relatively uniform layer of said powder blend on said backing strip, sintering said layer in a reducing atmosphere at a temperature ranging from at least about 1750° F. to about 1800° F. and thereafter cooling the sintered said layer in a reducing atmosphere to a temperature ranging from about 725° F. to about 850° F. forming a composite strip including a sintered porous matrix having a pore volume ranging from about 35% to about 49% tenaciously bonded to said backing strip, immersing said composite strip in a molten lead-tin bearing alloy at a temperature ranging from about 725° F. to about 850° F., vibrating said porous strip relatively to said molten bearing alloy causing infiltration and substantially complete filling of the pores thereof at a frequency of at least about 3000 cycles per minute, said molten bearing alloy consisting essentially of from about 3% to about 3½% tin and the balance lead, and thereafter removing the excess of said bearing alloy from said composite strip and cooling said composite strip.

References Cited in the file of this patent

UNITED STATES PATENTS

| 2,198,253 | Koehring | Apr. 23, 1940 |
| 2,326,372 | Lignian | Aug. 10, 1943 |
| 2,522,082 | Arnold | Sept. 12, 1950 |
| 2,902,748 | Schaefer | Sept. 8, 1959 |
| 2,986,464 | Lewis et al. | May 30, 1961 |

FOREIGN PATENTS

| 714,681 | Great Britain | Sept. 1, 1954 |
| 216,039 | Australia | June 10, 1958 |